United States Patent [19]

Owaki

[11] Patent Number: 5,460,374
[45] Date of Patent: Oct. 24, 1995

[54] GAME DEVICE

[75] Inventor: Hidetaka Owaki, Tokyo, Japan

[73] Assignee: Kabushiki Kaisha Sega Enterprises, Tokyo, Japan

[21] Appl. No.: 220,652

[22] Filed: Mar. 31, 1994

[30] Foreign Application Priority Data

Mar. 31, 1993 [JP] Japan ................................. 5-074571

[51] Int. Cl.$^6$ ..................................................... A63F 9/22
[52] U.S. Cl. ........................ 273/148 B; 273/435; 380/3; 380/4; 340/825.31; 364/DIG. 1
[58] Field of Search .............................. 273/148 B, 85 G, 273/434, 435; 380/3, 4; 340/825.31; 364/222.5, DIG. 1

[56] References Cited

U.S. PATENT DOCUMENTS

| | | | |
|---|---|---|---|
| 4,442,486 | 4/1984 | Mayer | 395/375 |
| 4,454,594 | 6/1984 | Heffron et al. | 395/375 |
| 4,462,076 | 7/1984 | Smith, III | 380/4 |
| 4,865,321 | 9/1989 | Nakagawa et al. | 273/85 G |
| 5,004,232 | 4/1991 | Wong et al. | 273/43.5 |
| 5,155,768 | 10/1992 | Matsuhara | 380/23 |
| 5,184,830 | 2/1993 | Okada et al. | 273/433 |

*Primary Examiner*—Raleigh W. Chiu
*Attorney, Agent, or Firm*—Dickstein, Shapiro & Morin

[57] ABSTRACT

A game device for loading a game cartridge 18 in a game machine body 10 to play a game based on game program information stored in the game cartridge 18 comprises a image recognition sensor 21 for, when the game cartridge 18 is loaded, reading a predetermined part 20 of the game cartridge 18, and an image judgement unit 22 for judging whether a specific indication M is indicated in the predetermined part 20 based on information inputted by the image recognition sensor 21, and transmitting the game program information to the game machine body 10 when the specific indication M is present. A game device judges identity of a specific indica whose uniqueness is socially recognized and is legally effectively discriminative from others, whereby security can be ensured.

11 Claims, 5 Drawing Sheets

GAME DEVICE

BACKGROUND OF THE INVENTION

The present invention relates to a game device for loading a game cartridge in a game machine body to play a game based on game program information stored in the game cartridge.

Some years have passed since home video game devices for enabling games to be played by replacing game cartridges (ROM cartridges) storing the game softs. Recently various entertaining game softs are developed, and playing these games on the video game devices are very popular. Especially supply of especially popular game softs is sometimes short, and such game cartridges are traded at higher prices. In these circumstances counterfeits of such game cartridges are incessantly made. Accordingly, effective security systems are required.

Manufacturers of game softs have contrived various security systems for the prevention of counterfeits of game softs they produced at high costs by sparing a number of workers and a long period of time.

In the conventional security systems, identity of data of a special code or others in game program information with data inputted in game machine bodies is judged, and identity of data of custom ICs mounted in game cartridges with data inputted in game machine bodies is judged.

In an example of the latter security system, an IC chip for the security system is mounted in a game cartridge, and when data, e.g., a name of the manufacturer, a LOGO, etc., stored in the IC chip agrees with data inputted in a game machine body, access to the game cartridge is permitted.

In the conventional security systems, it is unavoidable that in judging identity of game program information with a game machine body, decoding data releases the security. It is also unavoidable that in judging identity of a custom IC with a game device body, a dead copy of the custom IC releases the security.

SUMMARY OF THE INVENTION

An object of the present invention is to provide a game device which does not judge identity of special data with a special IC chip or others, but judges identity with a specific indication whose uniqueness is socially recognized and which is effectively discriminative.

The object is achieved by a game device for loading an external memory means on a game machine body to play a game based on game program information stored in the external memory means, the game device comprising: image recognizing means for reading a predetermined part of the mounted external memory means; and image judging means for judging whether or not a specific indication is present in the predetermined part, based on information inputted by the image recognizing means, and transmitting the game program information to the game machine body when the specific indication is present.

In the above-described game device, it is preferable to use a specific indication, the unauthorized use of which on the external memory means is legally prohibited.

In the above-described game device, it is preferable that the specific indication is visually recognizable.

In the above-described game device, it is preferable that the specific indication is a trademark.

In the above-described game device, it is preferable that the predetermined part is formed on an exterior surface of the external memory means.

In the game device according to the present invention for loading an external memory means on a game machine body to play a game based on game program information stored in the external memory means, there are provided image recognizing means for reading a predetermined part of the mounted external memory means, and image judging means for judging whether or not a specific indication is present in the predetermined part, based on information inputted by the image recognizing means, and transmitting the game program information to the game machine body when the specific indication is present, whereby when the image recognizing means judges that the specific indication is present in the predetermined part, security is released, and the game program information stored in the external memory means is transmitted to the game machine body.

Used as the specific indication is an image indication the use of which is prohibited to a person other than an authorized person having a right to indicate the specific indication to the external memory means, whereby indication of the specific indication by the person other than the authorized person can be prohibited.

The specific indication is visually recognizable, whereby conveniently the properness of the external memory means can be visually recognized without relying on the specially coded security system.

The specific indication is a registered trademark, whereby the use of the trademark right is prohibited to a person other than an authorized person having a right to indicate the trademark to the external memory means, whereby indication of the trademark by the person other than the authorized person can be prohibited.

The predetermined part is formed on the external surface of the external memory means, whereby conveniently the specific indication can be visually recognized.

DETAILED DESCRIPTION OF PREFERRED EMBODIMENTS

The game device according to one embodiment of the present invention will be explained with reference to the drawings.

Figure 1:
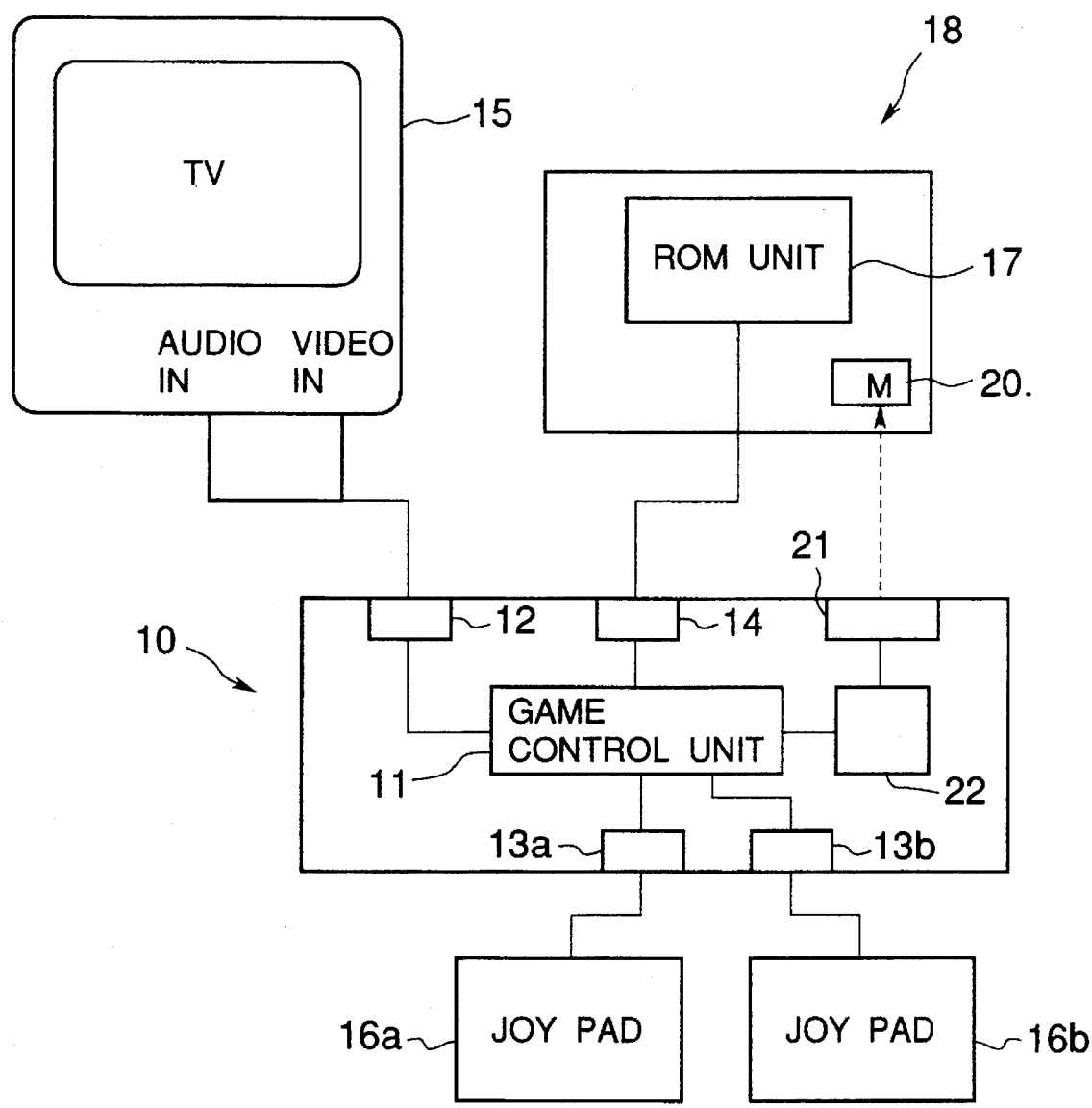
FIG. 1 is a block diagram of the game device according to one embodiment of the present invention.

As shown in FIG. 1, in a game machine body 10 there are provided a game control unit 11 for controlling a game, an output interface 12 for outputting sound signals and video signals, input interfaces 13a, 13b for inputting operation signals, and an input/output interface 14 for inputting/outputting a program or data of a game. The output interface 12, the input interfaces 13a, 13b and the input/output interface 14 are respectively connected to the control unit 11.

The game machine body 10 is connected through the output interface 12 to a television apparatus 15 as a display for displaying contents of a game, and is connected through the input interfaces 13a, 13b to various controllers, e.g., Joy pads 16a, 16b for operating progress of the game. Thus the game device comprises the game machine body 10, the television apparatus 15, the Joy pads 16a, 16b, etc.

Figure 2:
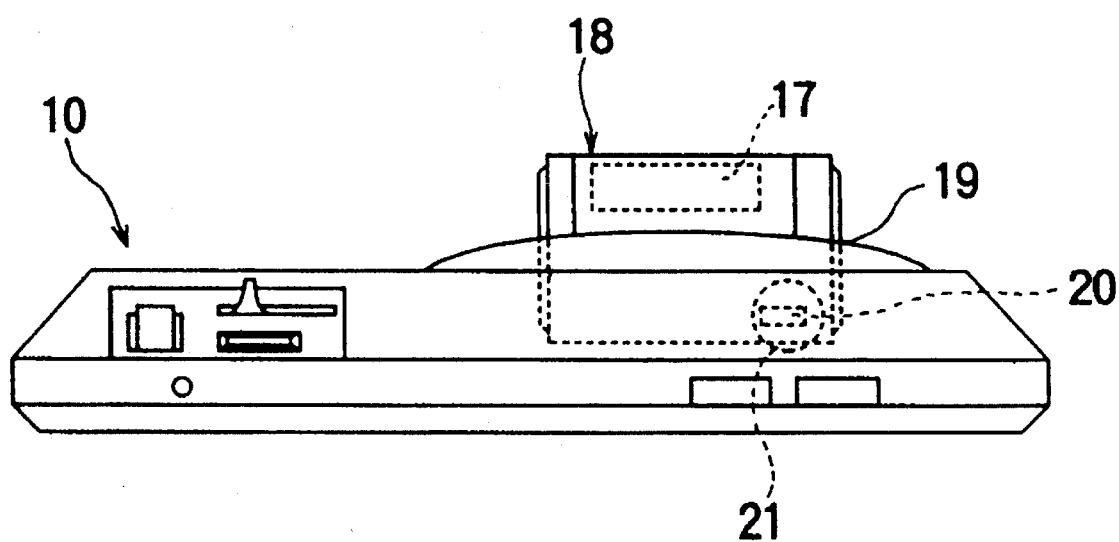
FIG. 2 is an explanatory view of the game machine body in FIG. 1.

As shown in FIG. 2, a connector-type game cartridge 18 as an external memory means is loaded in the game machine body 10. The game cartridge 18 accommodates a ROM unit 17 storing game program information, etc. The game cartridge 18 is inserted into a cartridge loading portion 19 formed in the shape of a groove in, e.g., the exterior surface of the game machine body 10, so that the ROM unit 17 is connected to the input/output interface 14 of the game machine body 10.

By loading the game cartridge 18 in the cartridge loading portion 19, game program information stored in the game cartridge 18 is transmitted to the game machine body 10, and the game can be played on the screen of the television apparatus 15. The game cartridge 18 can be pulled out of the cartridge loading portion 19 to be replaced by another game cartridge 18 storing another game program information. Thus various games can be played.

Figure 3:
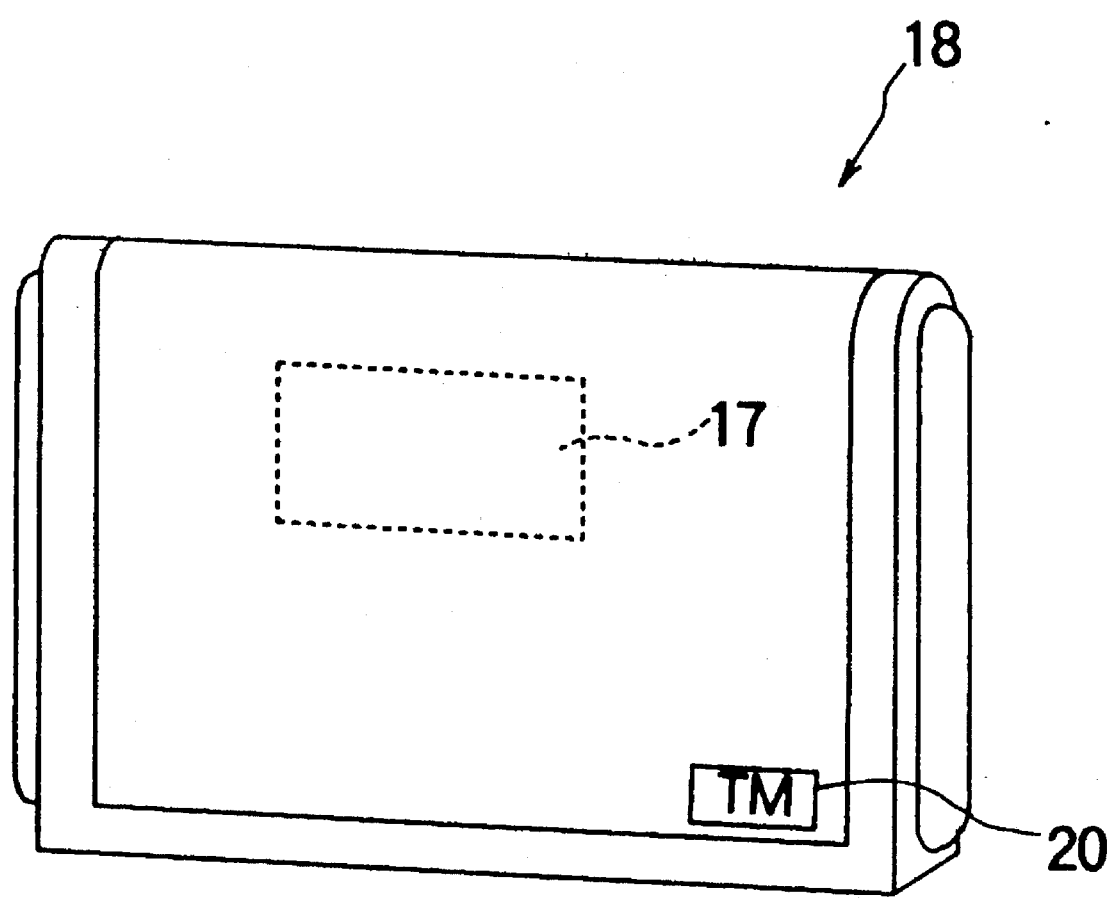
FIG. 3 is a schematic perspective view of the game cartridge of FIG. 2.

As shown in FIG. 3, any game cartridge 18 applies a specific indication M on a predetermined part 20 of the exterior planar surface of the game cartridge 18 to be put into the cartridge loading portion 19.

The specific indication M is visually recognizable. The specific indication M shows that the game cartridge 18 or a game program stored in the game cartridge 18 is proper on the basis of the specific indication M.

Accordingly the specific indication M prohibits a person other than an authorized person having a right to indicate the specific indication M to the game cartridge 18, from indicating the specific indication M.

The specific indication M also includes registered trademarks, such as "SEGA", "PRODUCED BY SEGA", "UNDER LICENSE FROM SEGA" etc.

The game machine body 10 accommodates an image recognition sensor 21 as an image recognition means, such as a camera, and an image judging unit 22 as an image judging means (see FIG. 1).

The image recognition sensor 21 is so positioned that a light detecting unit thereof is opposed to the cartridge loading portion 19, and the predetermined part 20 of the game cartridge 18 in the cartridge loading portion 19 is within a recognition range of the image recognition sensor 21 (see FIG. 2). The recognition range is illuminated by illuminating means (not shown).

Thus when the game cartridge 18 is loaded in the cartridge loading portion 19, the image recognition sensor 21 can read the predetermined part 20 of the game cartridge 18.

Information of the predetermined part 20 read by the image recognition sensor 21 is outputted to the image judgement unit 22. When the specific indication M is present in the predetermined part 20, the image recognition sensor 21 reads the specific indication M and recognizes it as an image, and outputs the image information to the image judgement unit 22.

The image judgement unit 22 compares the image information with the specific indication M which has been inputted to judge whether or not the image information is identical with the specific indication M inputted beforehand. When the image information agrees with the specific indication M, the image judgement unit 22 outputs an agreement signal, and outputs a disagreement signal when the image information does not agree with the specific indication M.

The specific indication M inputted beforehand in the image judgement unit 22 is not necessarily one and may be a plurality of kinds which are approved by, e.g., business contracts, etc., as long as they are like the specific indication M and is allowable to be used in the game device.

The agreement signal or the disagreement signal of the image judgement unit 22 is supplied to the game control unit 11. When the agreement signal is supplied to the game control unit 11, security is released, and program information of the game cartridge 18 is transmitted to the game control unit 11. When the disagreement signal is supplied to the game control unit 11, security is not released, and program information of the game cartridge 18 is refused to be transmitted to the game control unit 11.

When the disagreement signal is inputted to the game control unit 11, the game control unit 11 concurrently conducts error processing by outputting a warning signal to display a warning, e.g., "This game cartridge cannot be used", on, e.g., the screen of the television apparatus 15. Otherwise the game control unit 11 outputs a stop signal to put the game machine body 10 in its inoperative state.

This error processing makes a player who has loaded a game cartridge into the game device notice that his game cartridge cannot be used.

That is, the image judgement unit 22 judges whether the specific indication M is indicated in the predetermined part 20, based on information inputted by the image recognition sensor 21, and when the specific indication M is indicated, game program information is transmitted to the game machine body 10.

Figure 4:
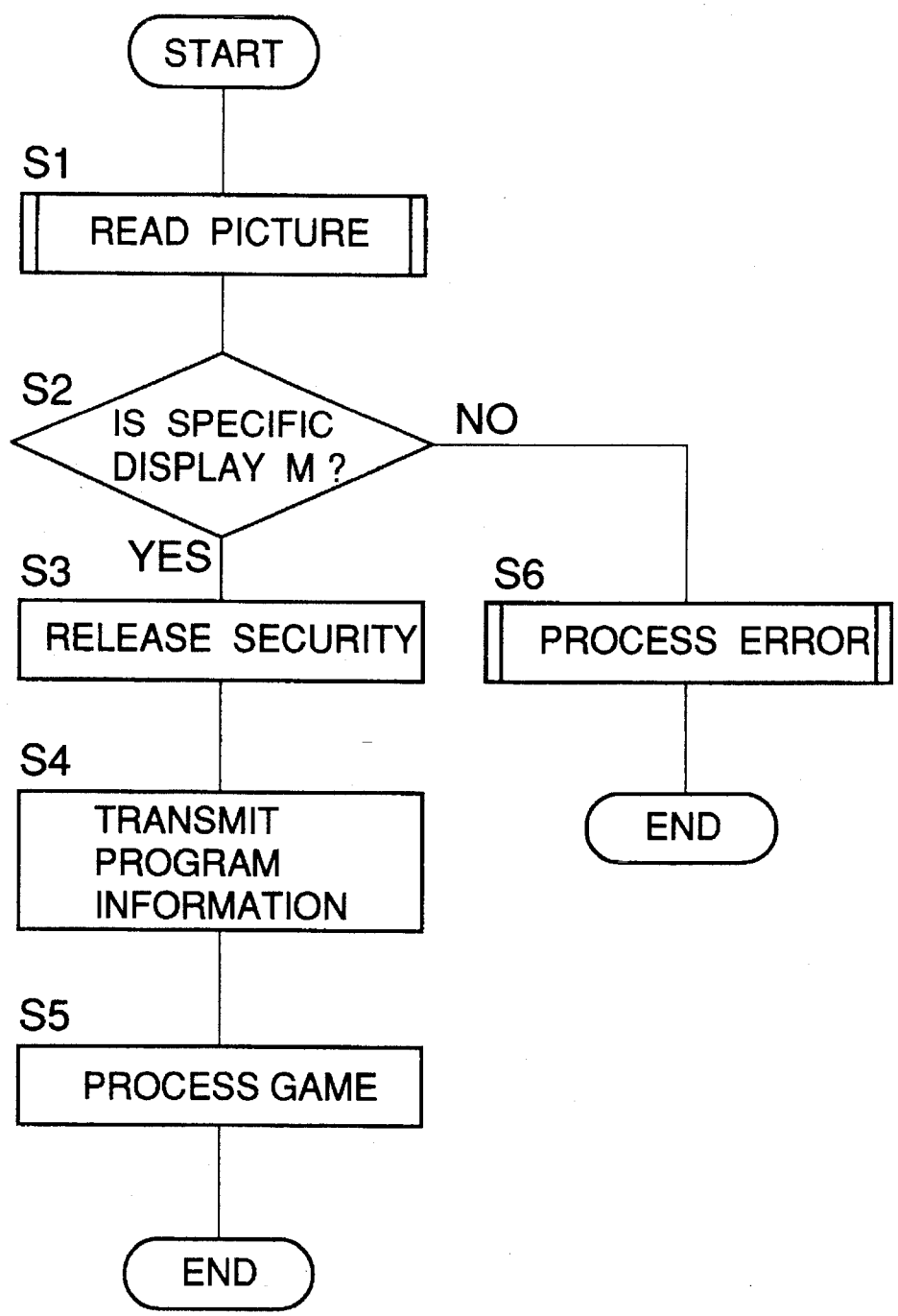
FIG. 4 is a flow chart of the operation of the game device.

Next, the operation of the game device will be explained with reference to the flow chart of FIG. 4.

First, the game cartridge 18 is loaded into the game machine body 10, and the image recognition sensor 21 reads the predetermined part 20 of the game cartridge 18 in an image (Step S1).

The read image information is supplied to the image judgement unit 22, and the image judgement unit 22 compares and judges whether the read image is the specific indication M, based on information of the specific indication M inputted beforehand thereto (Step S2).

When the read image is recognized as the specific indication M, security is released (Step S3). When the security is released, program information of the game cartridge 18 is transmitted to the game control unit 11 (Step S4), and the game processing is conducted (Step S5).

When the read image is recognized as other than the specific indication M, security is not released, and error processing, such as warning display, etc. is conducted (Step S6).

Although the conventional security system relies on technical means for judging identity of special codes, special IC chips, etc., the game device according to the present invention judges identity of the specific indication M to prohibit a person other than a authorized person having the right to indicate the specific indication M to the game cartridge 18 from indicating the specific indication M, whereby security can be secured without failure.

Specifically, the specific indication M has a power which can prohibit a person other than an authorized person having a right to indicate the specific indication M to the game cartridge 18, from indicating the specific indication M, whereby it is confirmed that the game cartridge 18 is made by an authorized person, and security can be secured without failure.

In the case that the specific indication M is visually recognizable, conveniently the properness of the game cartridge can be visually judged without relying on the image recognition sensor 21 and the image judgement unit 22.

Especially in the case that the specific indication M is a registered trademark, since the trademark is certainly applied on the game cartridge, and the uniqueness of the trademark is socially recognized, its imitation is regally and effectively prohibited. The identity of the trademark can further ensure the security without failure by judging identity of the specific indication M.

When the predetermined part 20 is formed on the exterior surface of the game cartridge 18, conveniently the specific indication M can be visually recognized at sight.

Figure 5:
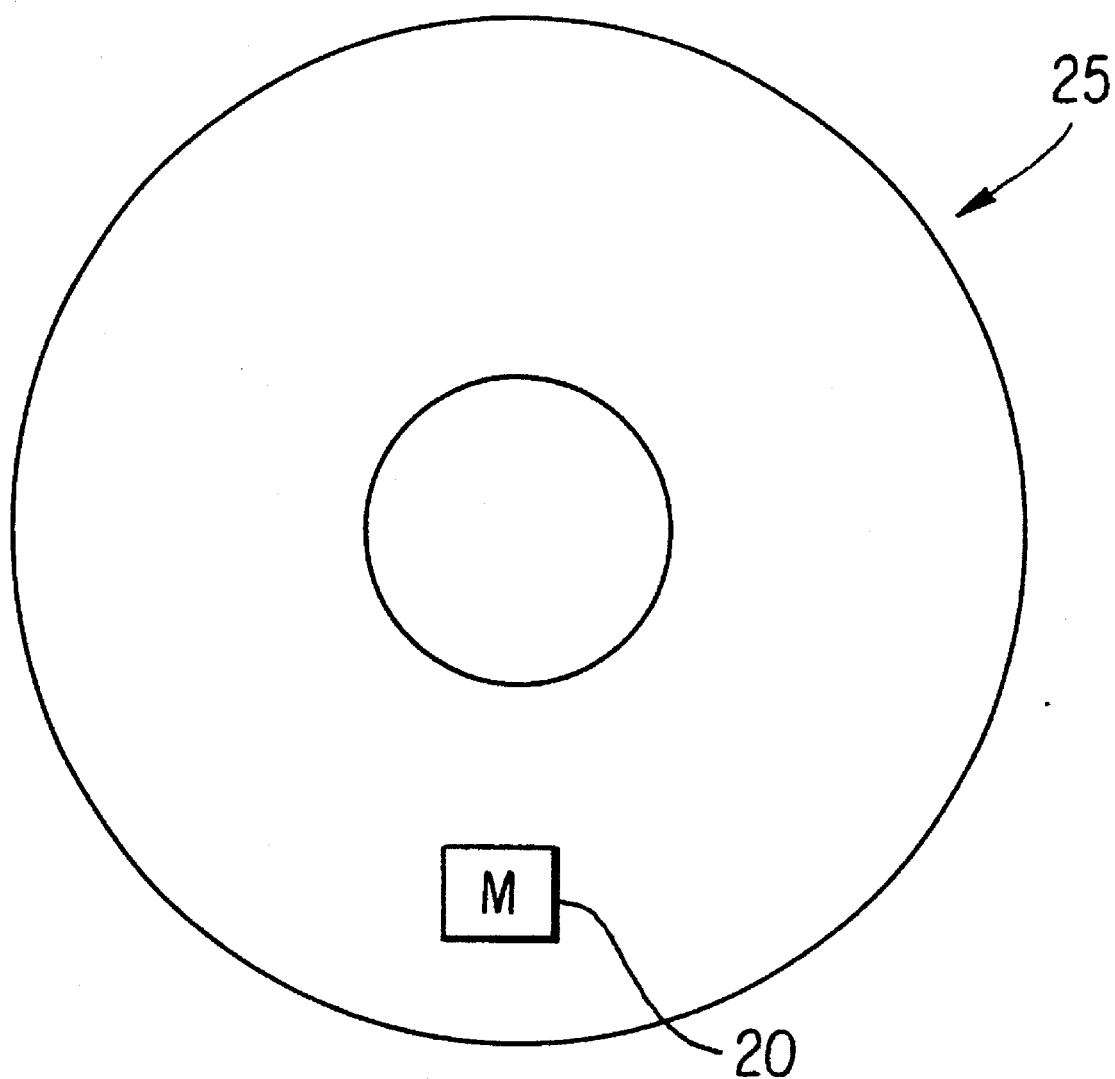
FIG. 5 is a plan view of a CD-ROM with a specific indication M.

The present invention is not limited to the above-described embodiment and include various modifications. The specific indication M as an image which is judged by the image judgement unit 22 may be any mark, such as indication marks, etc. determined by, the industrial associations, whose uniqueness is socially recognized so as to effectively expel its imitation. The external memory means for obtaining image information, CD-ROMs may be used in place of the game cartridge. In the case that a CD-ROM is used. As shown in FIG. 5, the specific indication M provided in the predetermined part 20 of the CD-ROM 25 is read from the CD-ROM 25 loaded in the game device.

What is claimed is

1. A game device comprising:

a loading portion for detachably loading an external memory means storing a game program information, said external memory means having a predetermined part with a visually recognizable image indication;

a game control unit for executing a game based on the game program information transmitted from said external memory means:

an optical image detecting means for optically detecting said predetermined part of the external memory means and generating a signal indicative of the detected image when said external memory means is loaded into said loading portion;

a comparison unit including means which stores in advance a reference signal indicative of said visually recognizable image indication and means for comparing said signal indicative of the detected image with said reference signal thereby determining whether or not said visually recognizable image indication is present in the predetermined part, and means for transmitting the game program information to said game control unit when said visually recognizable image indication is present in said predetermined part.

2. The game device according to claim 1, wherein said visually recognizable image indication is a trademark.

3. In combination comprising a storage means for storing a game program and an electronic apparatus for executing a game, said storage means having a predetermined area with a proprietary image indication formed thereon so as to be visually recognizable, and said electronic apparatus comprising:

a loading portion to which said storage means is detachably loaded;

an optical image detecting means for optically detecting said predetermined area and generating a signal indicative of the optically detected image when said storage means is loaded into said loading portion;

a comparison unit including means which stores a reference signal indicative of said proprietary image indication, means for comparing said signal indicative of the optically detected image with said reference signal, and means for generating an agreement signal when said signal indicative of the optically detected image agrees with said reference signal;

a game control unit for executing a game; and means for transmitting said game program from said storage means to said game control unit in response to said agreement signal.

4. The combination according to claim 3, wherein said storage means is a cartridge containing a ROM unit in which the game program is stored and said predetermined area is defined on an exterior planar surface of said cartridge.

5. The combination according to claim 3, wherein said proprietary image indication is a trademark.

6. A gaming apparatus comprising:

a game control unit for executing a game;

a loading port to which a storage means is detachably loaded, said storage means storing a game program and having a predetermined area with a proprietary image indication formed thereon so as to be visually recognizable;

an optical image detecting means positioned correspondingly to said predetermined area, said optical image detecting means optically detecting said predetermined area and generating a signal indicative of the optically detected image;

a comparison unit including means which stores a reference signal indicative of said proprietary image indication, means for comparing said signal indicative of the optically detected image with said reference signal, and means for generating an agreement signal when said signal indicative of the optically detected image agrees with said reference signal; and means for transmitting said game program from said storage means to said game control unit in response to said agreement signal.

7. A gaming apparatus comprising:

a game control unit for executing a game;

a loading port in which a storage device is detachably loaded, said storage device storing a game program and having a predetermined area on a substantially flat plane at a visually observable place of said storage means;

an optical image detecting sensor formed so as to be positioned correspondingly to, and optically detect, said predetermined planar area and to generate a signal indicative of the detected image when said storage device is loaded in said loading port;

a comparison unit which stores a reference signal indicative of a proprietary image indication and compares said signal indicative of the detected image with said reference signal to generate one of an agreement signal and a disagreement signal; and a transmitter for transmitting said game program from said storage device to said game control unit in response to the agreement signal when said predetermined planar area has a proprietary image indication corresponding to said reference signal.

8. The gaming apparatus of claim 7, wherein said transmitter does not transmit the game program in response to the disagreement signal when said predetermined planar area lacks a proprietary image indication corresponding to said reference signal.

9. A storage means for use with a game control unit having an optical image detecting sensor, comprising means for storing a game program which is operable on said game control unit, a predetermined area of a substantially flat plane positioned correspondingly to said optical image detecting sensor, and a proprietary image indication formed in said predetermined area so as to be visually recognizable.

10. The storage means according to claim 9, wherein said storage means is a cartridge containing a ROM unit in which the game program is stored and said predetermined area is defined on an exterior planar surface of said cartridge.

11. The storage means according to claim 9, wherein said proprietary image is a trademark.

* * * * *

REEXAMINATION CERTIFICATE (3826th)

United States Patent [19]
Owaki

[11] B1 5,460,374
[45] Certificate Issued Aug. 3, 1999

[54] GAME DEVICE

[75] Inventor: Hidetaka Owaki, Tokyo, Japan

[73] Assignee: Kabushiki Kaisha Sega Enterprises, Tokyo, Japan

Reexamination Request:
No. 90/005,135, Oct. 1, 1998

Reexamination Certificate for:
Patent No.: 5,460,374
Issued: Oct. 24, 1995
Appl. No.: 08/220,652
Filed: Mar. 31, 1994

[30] Foreign Application Priority Data

Mar. 31, 1993 [JP] Japan .................................. 5-074571

[51] Int. Cl.⁶ ..................................................... A63F 9/22
[52] U.S. Cl. .............................. 273/148 B; 380/3; 380/4; 340/825.31; 463/29; 463/44; 364/DIG. 1
[58] Field of Search .................. 463/29, 44; 340/825.31; 364/DIG. 1; 380/3, 4

[56] References Cited

U.S. PATENT DOCUMENTS

| | | |
|---|---|---|
| 4,442,486 | 4/1984 | Mayer . |
| 4,454,594 | 6/1984 | Heffron et al. . |
| 4,860,128 | 8/1989 | Nakagawa . |
| 4,967,286 | 10/1990 | Nomula . |

FOREIGN PATENT DOCUMENTS

| | | |
|---|---|---|
| 1005263 | 6/1993 | Belgium . |
| 0 080 244 | 6/1983 | European Pat. Off. . |
| 329122 | 8/1989 | European Pat. Off. . |
| 342748 | 11/1989 | European Pat. Off. . |
| 378385 | 9/1990 | European Pat. Off. . |
| 545472 | 6/1993 | European Pat. Off. . |
| 553545 | 8/1993 | European Pat. Off. . |
| 3122713 | 5/1991 | Japan . |
| 9101358 | 3/1993 | Netherlands . |
| 2250626 | 6/1992 | United Kingdom . |

*Primary Examiner*—Michael O'Neill

[57] ABSTRACT

A game device for loading a game cartridge 18 in a game machine body 10 to play a game based on game program information stored in the game cartridge 18 comprises a image recognition sensor 21 for, when the game cartridge 18 is loaded, reading a predetermined part 20 of the game cartridge 18, and an image judgement unit 22 for judging whether a specific indication M is indicated in the predetermined part 20 based on information inputted by the image recognition sensor 21, and transmitting the game program information to the game machine body 10 when the specific indication M is present. A game device judges identity of a specific indica whose uniqueness is socially recognized and is legally effectively discriminative from others, whereby security can be ensured.

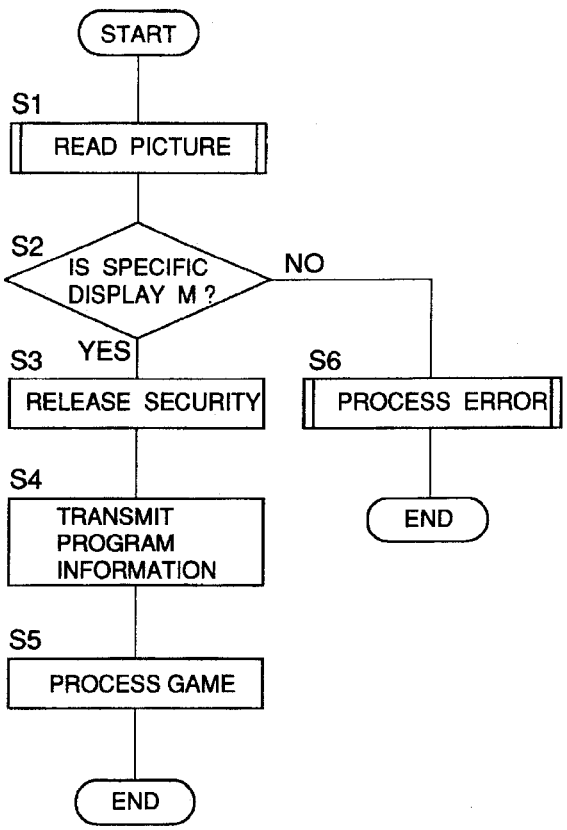

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

\* \* \* \* \*